United States Patent [19]

Glad et al.

[11] 4,406,792

[45] Sep. 27, 1983

[54] SEPARATION AGENT

[76] Inventors: Magnus J. Glad, Nyckelkroken 64, S-22 247 Lund; Sten A. Ohlson, Merkuriusgatan 10, S-22 357 Lund; Lennart H. Hansson, Harlemansvag 4a, S-22 230 Lund; Mats-Olle Mansson, Slalomgrand 10, S-24 300 Hoor; Per-Olof Larsson, Fagelhundsvagen 56, S-22 003 Lund; Klaus H. Mosbach, Lackalanga 31, S-24 402 Furulund, all of Sweden

[21] Appl. No.: 321,692

[22] Filed: Nov. 16, 1981

[51] Int. Cl.$^3$ .............................................. B01D 15/08
[52] U.S. Cl. ................................... 210/656; 210/502; 252/428; 252/432; 252/449
[58] Field of Search ...................... 210/198.2, 635, 656, 210/502; 252/428, 432, 433, 455 R, 453, 449

[56] References Cited

U.S. PATENT DOCUMENTS

| | | | |
|---|---|---|---|
| 3,795,313 | 3/1974 | Kirkland et al. | 210/198.2 |
| 4,029,583 | 6/1977 | Chang et al. | 210/198.2 |
| 4,159,966 | 7/1979 | Roberts | 252/430 |
| 4,311,812 | 1/1982 | Manziek | 252/432 |

OTHER PUBLICATIONS

Synthesis of Cellulose Derivatives Containing the Dihydroxyboryl Group by Weith et al., in Biochemistry, vol. 9, No. 22, (1970), pp. 4396–4401.

High Performance Liquid Affinity Chromatography by Ohlson et al., in FEBS Letters, vol. 93, No. 1, pp. 5–9, (1978).

Preparation and Use of a Boronic Acid Affinity Support by Mallia et al., in Analytical Letters, vol. 14, pp. 649–661, (1981).

*Primary Examiner*—John Adee
*Attorney, Agent, or Firm*—Lerner, David, Littenberg, Krumholz & Mentlik

[57] ABSTRACT

A chromatographic separation agent composed of a water unsoluble solid substance showing dihydroxyboryl groups. Said solid substance is structurally composed of a water unsoluble silica or silicate material as basic structure and, via a linkage to silicon atoms in the silica or silicate material, covalently bound dihydroxyboryl groups in acid, salt or complex form

8 Claims, No Drawings

SEPARATION AGENT

This invention relates to a separation agent consisting of a water unsoluble solid substance comprising dihydroxyboryl groups.

A number of polymers comprising dihydroxyboryl groups ($-B(OH)_2$) has during the last decade been proposed for separation of molecules containing vicinal cis-hydroxy groups such as nucleosides, nucleotides, catecholamines, carbohydrates and transfer-RNA (see for example C. F. Poole et al, J. Chromatography 184 (1980) 99–183). Said cis-hydroxy groups in these substances have the capability of reversibly forming cyclic boronate esters (complex) with the boronate anion at high pH, and forming of these complexes is dependent on such parameters as pH, ionic strength, temperature and structure of the hydroxy group-containing compounds. The polymers which have been used as basic material in these separation agents, for example cellulose and polymethacrylic acid, have the drawback of leading to bad flow characteristics due to poor rigidity of the polymer and bad separation characteristics.

According to the present invention there has now been provided a separation agent of the above-mentioned type, which has superior flow and separation characteristics and which is well suited for use in connection with for example high performance liquid chromatography (HPLC). The separation agent according to the invention is characterized in that the solid substance structurally is composed of a water insoluble silica or silicate material as basic structure and, via a linkage to silicon atoms in said silica or silicate material, covalently bound dihydroxyboryl groups in acid, salt, or complex form.

The expression "silica material" is herein intended to mean silicic acid in more or less dehydrated form, including silica. The basic material may be non-porous or porous silica or glass particles, which are known per se as carrier material in several applications, for example in biochemical determination methods, but can also consist of the inner wall of a tube or be a disk. Each dihydroxiboryl group is bound to a carbon atom in a preferably aromatic hydrocarbon residue, especially to a carbon atom in a phenyl or naphthyl group which also can comprise other substituents such as a lower alkyl or alkoxy group (e.g. 1–5 C atoms), a hydroxy group or a halogen atom.

The aromatic hydrocarbon residue (e.g. a phenyl or naphthyl group) is bound, preferably via an intermediate nitrogen atom such as in an amino or amide group, to an alkylene chain which contains 1–22, preferably 2–18, carbon atoms and optionally being interrupted by one or more oxygen, sulphur or nitrogen atoms and/or being substituted with one or more hydroxy groups. Except for the case of amide and ester groups, preferably at most 1 atom or other kind than carbon and hydrogen is bound to one and the same carbon atom in the chain. The alkylene chain is in turn bound, optionally via an intermediate silicon atom, preferably to an oxygen atom belonging to a hydroxy group, said hydroxy group being bound to a silicon atom in the as basic material for the present separation agent used water insoluble silica or silicate material, or optionally directly to a silicon atom in said basic material.

The introduction of the bridge-forming alkylene chain structure and the aromatic-carried dihydroxyboryl groups in the silica or silicate material is preferably performed in two steps. A substituent which corresponds to the alkylene chain and which contains a reactive structure such as for example an epoxy or carboxyl group is introduced in the first step to produce a first reactive product. In the second step, the first reactive product is reacted with an aromatic compound showing, besides possible other substituents a dihydroxiboryl group and an atom or group which can react with the reactive structure at the alkylene chain, for example a primary or secondary amino group, when the reactive structure is an epoxy or carboxyl group.

It is especially preferred to react the water insoluble silica or silicate material in a first step with γ-glycidoxy-propyltrimethoxy silane. In a second step, the epoxi group-containing material it is preferably reacted with 3-aminophenyl boric acid. Optionally after hydrolysis of remaining methoxy groups to hydroxy groups, hydroxy groups bound to Si-atoms in the material can be deactivated with $Si(CH_3)_3Cl$, if necessary.

The first step is carried out under water-free conditions, since the presence of traces of water can lead to undesired side reactions such as cross-linking and polymerization.

The invention will be illustrated by means of examples in the following text.

EXAMPLE 1

Preparation of silica comprising dihydroxiboryl groups.

To 3 g porous silica (LiChrosorb SI 100, 10 μm, E Merck, Darmstadt, Federal Republic of Germany), dried at 200° C. over night and then suspended in 100 ml Na-dried toluene, was added 80 μl triethylamine (potassium hydroxide-dried) and 4 ml γ-glycidoxy-propyl-trimethoxysilane. The mixture was reflux boiled under nitrogen for 4 h in a flask fitted with teflon stirrer. Thereafter the substituted silica was filtered off and washed on a glass filter funnel with toluene acetone and diethyl ether (100 ml of each) and finally dry-sucked. A sample of the obtained product was hydrolyzed with diluted sulphuric acid (pH 2, 90° C., 1h) for transforming of epoxy groups to hydroxy groups, and the concentration of said epoxy groups was determined through periodate oxidation according to S. Siggia, Quantitative Organic Analysis via Functional Groups, Wiley and Sons, New York, 1949, p. 8, and was found to be about 320 μmol/g product.

600 mg 3-aminophenyl boric acid was added to a suspension of 2 g of the epoxy-substituted silica, prepared as above, in 15 ml water. The pH of the mixture was then adjusted to 8.5 with 3M sodium hydroxide and the mixture was placed in an ultrasonic bath for 10 minutes to facilitate the solution of the boric acid. The pH was again adjusted to 8.5 and the coupling reaction was performed at 21° C. for 24 h with gentle shaking. The reaction product was filtered off and thoroughly washed with 0.5 M sodium chloride, 0.1 M sodium bicarbonate, 1 mH hydrochloric acid, water and acetone and dried under vacuum. The bore contents (determined according to H Baron, Z, Anal. Chemie, 143 (1954) 339) of the boric acid-substituted silica was 0.27% (w/w) corresponding to 250 μmol/g product.

EXAMPLE 2

Chromatography

An Altex pump (pump model 110A from Altex Scientific, Inc. Berkeley, Calif., U.S.A.) was used together with a UV-detector (Spectro Monitor III from Laboratory Data Control, Riviera Beach, Fla., U.S.A.) or a refractory index detector (Optilab Multiref from Optilab AB, Vällingby, Sweden).

Silica comprising dihydroxyboryl groups (about 1.2 g) and prepared according to example 1 was packed in a column of polished "316" stainless steel (100 mm ×5 mm inner diameter; total volume about 2.0 ml) with use of packaging technique according to P. A. Bristow et al, J. Chromatogr., 131 (1977) 57, with suspension in water/methanol (10/90, v/v) at 14 MPa. Performance of the column was investigated with a mixture of phenol, 2,6 dimethylphenol and 4-ter.-butylphenol in water/methanol (50/50, v/v) and a typical HETP-value was 0.083 mm (4-tert.-butylphenol) corresponding to about 1200 theoretical plates.

The chromatography was performed at room temperature (20°-22° C.) and the pressure was about 2.1 MPa at a flow rate of 1 ml/minute. An injection volume of 10 μl containing 10-50 μg of each component in the mixtures was used in each experiment.

(a) Separation of nucleosides

A synthetic mixture of eight nucleosides was applied on the column. Isocratic elution was performed with 0.1 M sodium phosphate pH 7.5.

Most components were well separated. As expected the nucleosides having only one free hydroxy group in 3-position in the ribos portion, i.e. desoxinucleosides and thymidin, were retarded less than the others. Despite the fact that these compounds cannot form cyclic boronate complex with the matrix, retardation and separation of also these compounds were observed.

At the set pH the separation was completed within 35 minutes. At higher pH values the separation can be better (due to stronger binding to the matrix), but this will occur at cost of longer separation time.

(b) Separation of nucleotides (I) A mixture of nono, di- and triphosphates of adenosin was applied on the column and eluated.

The structure of the compounds differs only through the number of phosphate groups bound to the C-atom in 5-position in the ribos portion.

It was observed that the number of negatively charged phosphate substituents significantly influence the capability of forming of boronate complex at fixed pH value.

(II) In a corresponding way a mixture of 3', 5'-cyclic adenosinmonophosphate and adenosinmonophosphate was separated. The cyclic form lacks free hydroxy group in 3-position of the ribos portion and correspondingly no cyclic complex may be formed with the dihydroxyboryl group, whereby it is less retarded than the adenosinmonophosphate.

(c) Separation of hydrocarbons (I) A mixture of fructose and glucose was applied on the column and eluted with 10 mM sodiumpyrophosphate, pH 8.25. The hydrocarbons were displayed as single peaks, but when a lower pH value was used two peaks were observed for fructose, which may be due to different affinities for the matrix of the isomeric forms of fructose which is always present in solution.

(II) The capacity factors for a number of hydrocarbons and similar compounds were determined through separate injection in the column. Elution was performed with 10 mM sodiumpyrophosphate, pH 8.25, 1 ml/minute and determination was performed by means of a refractory index detector. The obtained results are shown in the following table:

| hydrocarbon | capacity factor (k') |
|---|---|
| glucose | 0.14 |
| sucrose | 0.21 |
| myo-inositol | 0.29 |
| galactose | 0.79 |
| fructose | 2.86 |
| mannitol | 3.79 |
| sorbitol | 4.14 |

When some of the hydrocarbons (fructose, mannitol and sorbitol) were eluted the refractory index detector responded with negative signals, and in experiment (I) the polarity of the output signal was changed over after the appearance of glucose.

We claim:

1. A separation agent comprising a water insoluble solid selected from the group consisting of silica material and silicate material, said solid having covalently bound to at least one of the silicon atoms of said solid a substituent containing a dihydroxyboryl group or acid, salt or complex of such group.

2. A separation agent according to claim 1, wherein said substituent is bound to said silicon atom through an aromatic hydrocarbon residue.

3. A separation agent according to claim 2, wherein the aromatic hydrocarbon residue is bound via an intermediate nitrogen atom to a group selected from an alkylene radical containing from 1 to 22 carbon atoms or an alkylene radical containing from 1 to 22 carbon atoms interrupted by at least one atom selected from the group consisting of oxygen, sulfur, or nitrogen.

4. A separation agent according to claim 3, wherein said alkylene radical is bound to said silicon atom of said insoluble solid via an intermediate second silicon atom.

5. A process for separation of substances containing vicinal cis-hydroxy groups, said process comprising the steps of contacting a solution of said substances with a separation agent so as to absorb said substances onto said separation agent, wherein said separation agent comprises a water-insoluble solid selected from the group consisting of silica material, silicate material, and mixtures of such materials, and wherein said solid has covalently bound to at least one of the silicon atoms of said solid a substituent containing a dihydroxyboryl group or acid, salt, or complex of such group; and eluting said substances from said separation agent so as to chromatographically separate one or more of said substances from each other.

6. A process according to claim 5, wherein said substituent is bound to said silicon atom through an aromatic hydrocarbon residue.

7. A process according to claim 6, wherein the aromatic hydrocarbon residue is bound via an intermediate nitrogen atom to a group selected from an alkylene radical containing from 1 to 22 carbon atoms or an alkylene radical containing from 1 to 22 carbon atoms interrupted by at least one atom selected from the group consisting of oxygen, sulfur, or nitrogen.

8. A process according to claim 7, wherein said alkylene radical is bound to said silicon atom of said insoluble solid via an intermediate second silicon atom.

* * * * *

UNITED STATES PATENT AND TRADEMARK OFFICE
CERTIFICATE OF CORRECTION

PATENT NO. : 4,406,792
DATED : September 27, 1983
INVENTOR(S) : Glad et al.

It is certified that error appears in the above-identified patent and that said Letters Patent are hereby corrected as shown below:

Column 2, line 59, "mH" should read --mM--.

Column 3, line 38, "nono," should read --mono- --.

Signed and Sealed this

Thirty-first Day of January 1984

[SEAL]

Attest:

GERALD J. MOSSINGHOFF

Attesting Officer     Commissioner of Patents and Trademarks